US008085673B2

(12) United States Patent
Hein (10) Patent No.: US 8,085,673 B2
(45) Date of Patent: Dec. 27, 2011

(54) METHOD AND APPARATUS FOR GENERATING BI-DIRECTIONAL NETWORK TRAFFIC AND COLLECTING STATISTICS ON SAME (75) Inventor: Richard W Hein, Burnaby (CA)

(73) Assignee: IXIA, Calabasas, CA (US)

(*) Notice: Subject to any disclaimer, the term of this patent is extended or adjusted under 35 U.S.C. 154(b) by 641 days.

(21) Appl. No.: 11/562,640

(22) Filed: Nov. 22, 2006

(65) Prior Publication Data
US 2008/0117907 A1 May 22, 2008

(51) Int. Cl.
G01R 31/08 (2006.01)
G06F 11/00 (2006.01)
(52) U.S. Cl. ..................... 370/241.1; 370/253
(58) Field of Classification Search .................. None
See application file for complete search history.

(56) References Cited

U.S. PATENT DOCUMENTS
2005/0022017 A1* 1/2005 Maufer et al. ................ 713/201
2005/0117576 A1* 6/2005 McDysan et al. ............ 370/389
2009/0094671 A1* 4/2009 Kurapati et al. .................. 726/1

OTHER PUBLICATIONS

Information Sciences Institute; "Transmission Control Protocol Darpa Internet Program Protocol Specification"; Prepared for Defense Advanced Research Projects Agency; Sep. 1981; pp. 1-85; University of Southern California, Mariana del Rey, CA 90291.
M. Allman et al; "TCP Congestion Control"; Internet: ftp://ftp.rfc-editor.org/in-notes/rfc2581.txt; Apr. 1999; pp. 1-14; Copyright (c) The Internet Society (1999).
Sriram R. Chelluri; "Virtex-II Pro FPGAs Enable 10 Gb iSCSI/TCP Offload"; Xcell Journal; Second Quarter 2006; pp. 58-60; Xilinx, Inc.

* cited by examiner

Primary Examiner — Ayaz Sheikh
Assistant Examiner — Sori Aga
(74) Attorney, Agent, or Firm — Jenkins, Wilson, Taylor & Hunt, P.A.

(57) ABSTRACT

A method and apparatus for testing network devices maintains state data in a memory corresponding to a current status for each one of a plurality of connections. Received and transmitted segment identifiers relate each received segment to one of the connections. Each received and transmitted segment is processed and advanced according to a TCP standard and the state data for each segment is updated in the memory. Statistics are collected for each segment as they are processed.

21 Claims, 4 Drawing Sheets

METHOD AND APPARATUS FOR GENERATING BI-DIRECTIONAL NETWORK TRAFFIC AND COLLECTING STATISTICS ON SAME

BACKGROUND

A current challenge for network equipment and network service suppliers is testing and evaluating products under realistic network volume and conditions.

Prior art approaches to this challenge include systems made of multiple processors running applications that emulate network conditions. Disadvantageously, a single processor emulating a large number of subscriber processors does not fully emulate in a deterministic manner the actual performance and behavior of multiple processors on a network. In addition, a large test system of multiple processors is expensive making such a test system prohibitively costly as it is scaled to emulate larger networks.

Another prior art approach is packet blasting test equipment. Packet blasting test equipment is able to emulate the volume of network traffic, but is not able to realistically emulate network performance that include such events as TCP segment retransmission and timeouts.

There is a need, therefore, for scalable and affordable network test equipment capable of more realistic emulation of network traffic and volume.

BRIEF DESCRIPTION OF THE DRAWINGS

An understanding of the present teachings can be gained from the following detailed description, taken in conjunction with the accompanying drawings of which like reference numerals in different drawings refer to the same or similar elements.

DETAILED DESCRIPTION

In the following detailed description, for purposes of explanation and not limitation, example embodiments disclosing specific details are set forth in order to provide an understanding of embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

A specific embodiment of a tester according to the present teachings generates and measures "stateful" network traffic according to the DoD Standard Transmission Control Protocol as defined in Request For Comment 793 published September 1981 (herein "the TCP standard") including retransmission of segments that are not acknowledged and timeouts. Measurements made in a system according to the present teachings, therefore, include measurements relating to the quality of a connection within context at layer 3/4 of the Open Systems Interconnect model. In a specific embodiment, the tester generates TCP segments without regard to payload content, receives TCP segments, and processes them according to the TCP standard retransmitting segments as dictated by the standard. A TCP connection is bi-directional, consists of two endpoints, and establishes a vehicle for communication via the TCP standard. In a specific embodiment, hardware circuitry, specifically a field programmable gate array ("FPGA") implements the TCP standard. To test and measure a greater number of connections to emulate a larger network, the tester is scaleable by simply adding state memory. The advantage of this scalability lies in the feature that an increase in the cost of the tester is relatively small relative to the overall system.

Figure 1:
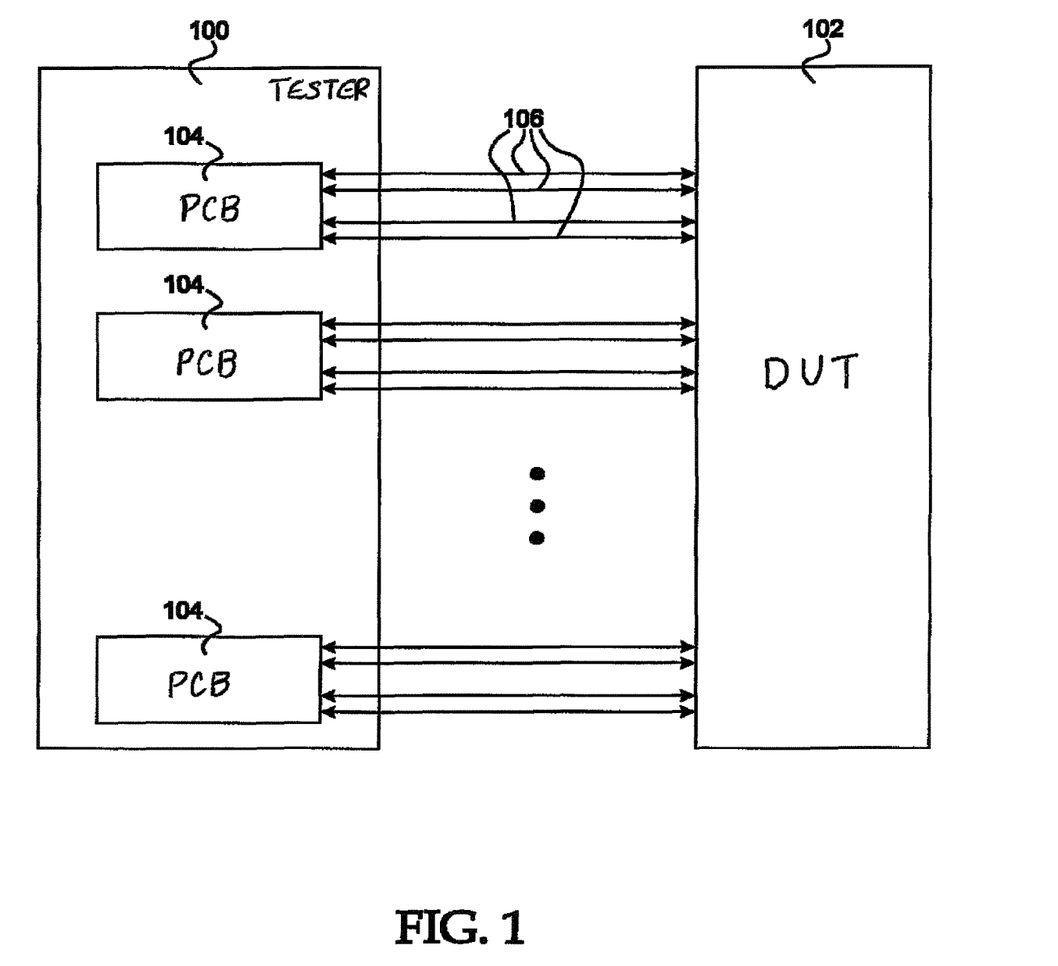
FIG. 1 illustrates connections between an embodiment of a tester according to the present teachings and a device under test.

With specific reference to FIG. 1 of the drawings, there is shown an illustration of connections between an embodiment of a tester 100 according to the present teachings and a device under test (herein "DUT 102"). In the example disclosed herein, the DUT 102 is a non-terminating TCP networking device that accepts TCP segments and forwards them. A specific embodiment of a tester according to the present teachings is able to measure the performance of the DUT as a networking device. Non-terminating DUTs include but are not limited to routers, switches, and edge aggregation devices. The tester 100 generates TCP traffic, receives the TCP traffic forwarded by the DUT, and measures the performance of the DUT in terms of whether it properly processes and forwards the TCP traffic it received according to the TCP standard. As one of ordinary skill in the art with benefit of the present teachings also appreciates that terminating devices may be tested as well. Examples of terminating devices include without limitation firewalls, servers, and web proxy devices.

FIG. 1 illustrates the tester 100 comprising multiple printed circuit boards (herein "PCB 104"). The tester 100 may use one or more of the PCBs 104 depending upon the size of the DUT 102 and the number of desired communication ports to be tested. In the specific embodiment illustrated, each printed circuit board 104 is able to accept four ports 106. Each port 106 provides full duplex communication and may be configured to be either a client port, a server port, or a combination client/server port. A server port is one where most of the data segments flow from the tester and to the device under test. The port remains full-duplex because there is control information flowing in both directions, but a bulk of the data flows from the tester to the device under test. A client port is one where most of the data communication flows from the device under test and to the tester. A client/server port is one where substantially equivalent volume of data traffic flows in both directions. In a specific implementation, there is always at least one server port or client/server port and one client port or client/server port for each tester 100, but the remaining two ports may be configured as client, server, or client/server as desired by a user.

Figure 2:
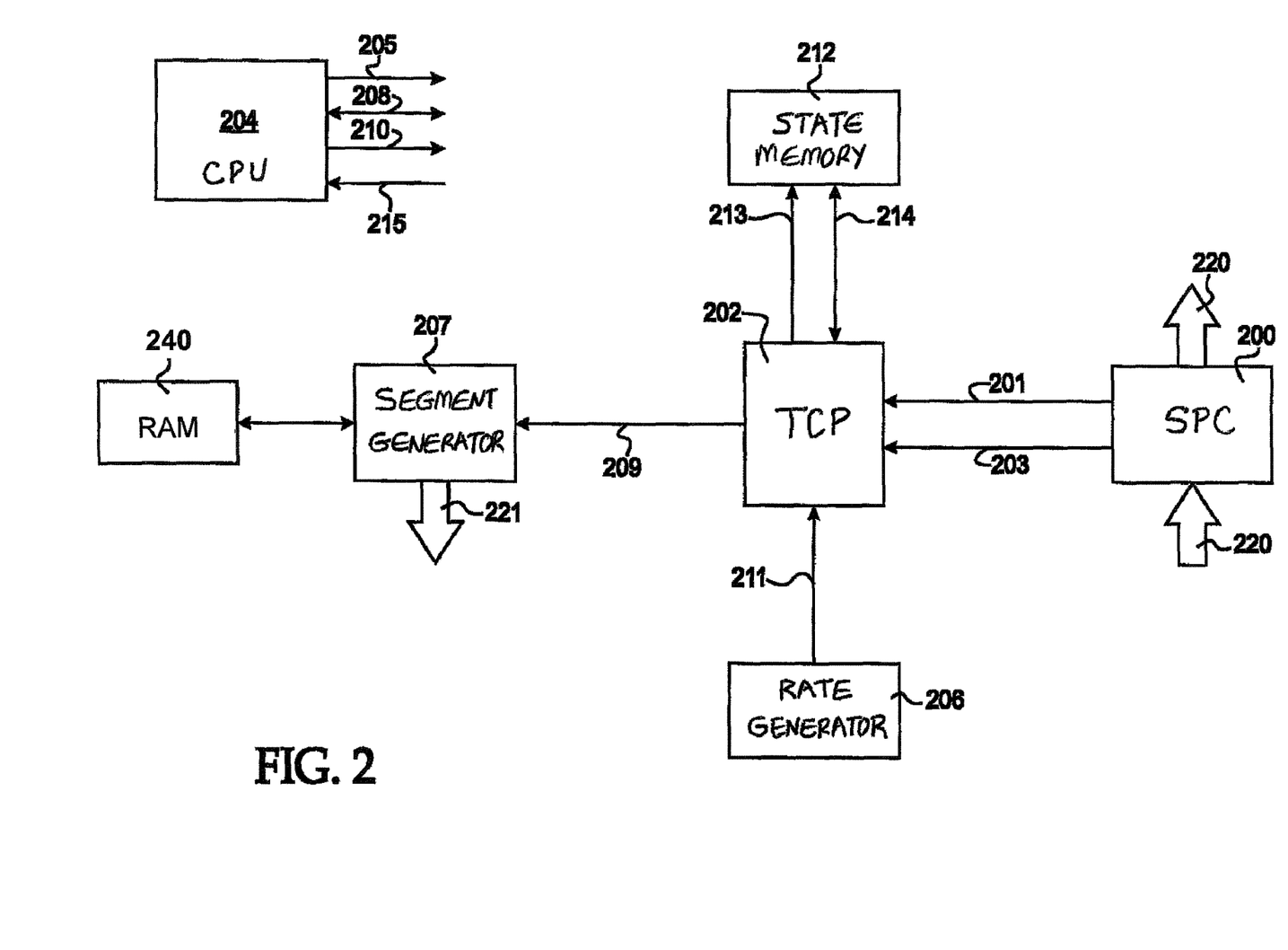
FIG. 2 illustrates an embodiment of logic consistent with the present teachings that supports one of the ports shown in FIG. 1.

With specific reference to FIG. 2 of the drawings, there is shown a block diagram of an embodiment of logic used to support each port 106 of the client/server PCB 104. The block diagram as shown is implemented in a 2-FPGA set, but may also be implemented as a single FPGA, ASIC, or other form of logic circuitry now known or later developed. Segments in a received data stream 220 are received through the port 106 by a stream processor controller (herein "SPC 200"). The SPC 200 receives packets and identifies and filters the TCP segments from the received stream 220. The SPC 200 extracts TCP receive segment header fields 201 from the filtered TCP segments and forwards them to TCP Processor (herein "TCP 202"). The SPC 200 indicates valid data in the receive segment header fields 201 with receive segment event signal 203. The SPC 200 then forwards the received data stream 220 to other circuitry unrelated to the present teachings.

The TCP processor 202 performs a realistic implementation of the TCP protocol according to the TCP standard. More specifically, the TCP 202 accepts TCP receive segment header fields 201 from the SPC 200, compares the received segment header fields 201 against header field values that are expected. The TCP 202 also receives transmit segment requests 211 from rate generator 206. The rate generator 206 is configured with a rate in terms of number of segments to transmit per unit of time, typically seconds, and tells the TCP 202 when to send a next segment. In response to the transmit segment requests 211, the TCP 202 sends a next transmission segment or implements the TCP retransmission protocol and retransmits a previously transmitted and since unacknowledged segment. As part of the TCP implementation function, the TCP 202 addresses external state memory 212 via a state address field 213. For each segment received, previously stored state data 214 is retrieved from the external state memory 212, processed according to the TCP standard and then the state of the current segment is updated by storing new state data 214 into the state memory 212. Accordingly, the external state memory 212 maintains a current status of all of the active TCP connections during test of the network.

Segment generator 207 accepts outgoing segment header information 209 from TCP 202. The segment generator 207 accesses templates stored in segment generator RAM 240 and uses the templates in conjunction with the outgoing segment header information 209 to generate a realistic TCP transmit segment stream 221 for presentation as transmit data stream 221 to the port 106

Central processing unit (herein "CPU") 204 shown in FIG. 2 of the drawings is connected to all functional blocks 200, 202, 206, 207, 210, 212. The actual connections are not shown for purposes of clarity. The interaction between the CPU 204 and the functional blocks to which it communicates is through an address bus 205, a bi-directional data bus 208, a read/write signal 210 providing indication from the CPU 204 as to which direction data flows on the data bus and an acknowledgement signal 215 permitting the functional blocks to acknowledge completion of a transfer of information. The CPU 204 configures each of the functional blocks in preparation for a test. The CPU 204 is also able to dynamically modify test parameters during a test. The dynamically modifiable test parameters permit the tester to more closely emulate realistic TCP traffic and application behavior.

Figure 3:
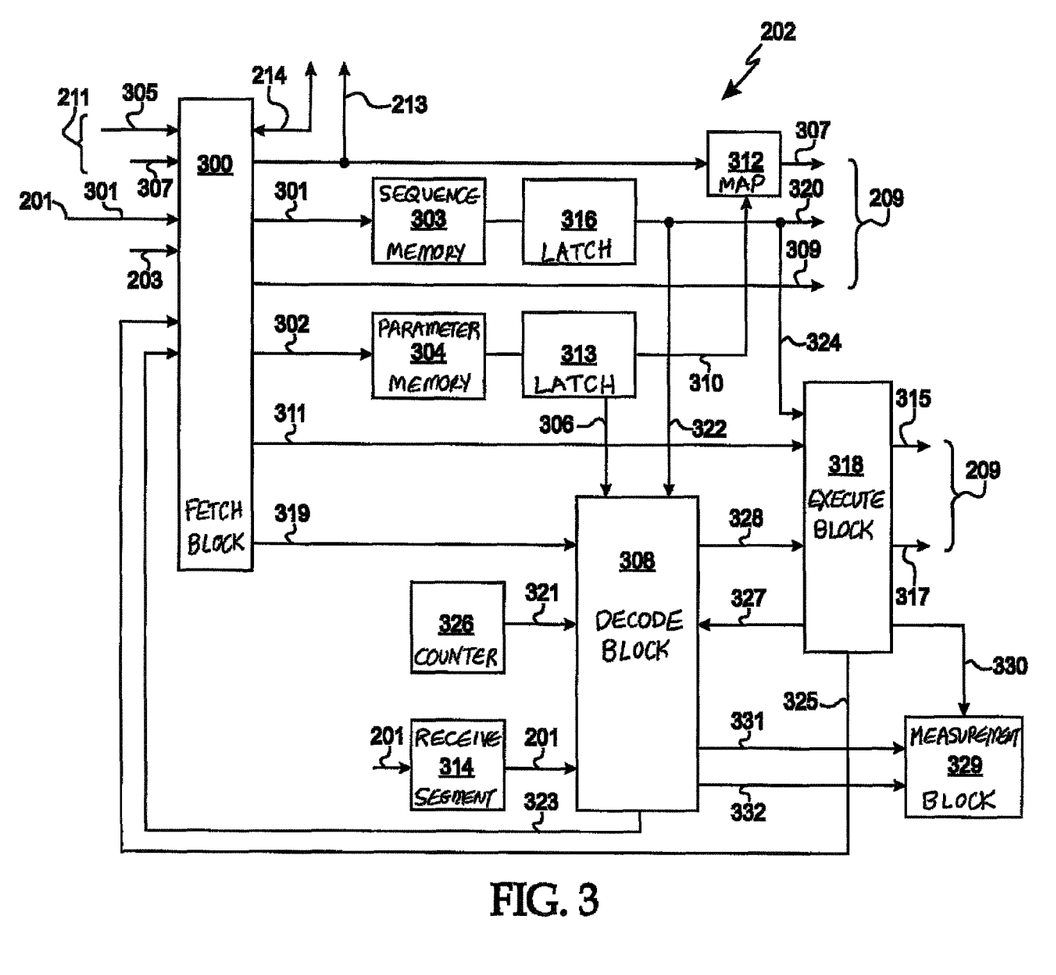
FIG. 3 illustrates a more detailed view of a specific embodiment of the TCP Processor logic according to the present teachings.

With specific reference to FIG. 3 of the drawings, there is shown an embodiment of a block diagram of the TCP 202 according to the present teachings in which fetch block 300 receives a portion of the receive segment header fields 201, comprising a receive segment identifier 301, and the receive segment event signal 203. The fetch block 300 also receives the transmit segment requests 211, comprising a transmit segment identifier 305 and transmit segment event signal 307. The fetch block 300 processes the receive segment identifier 301 and the receive segment event signal 203 and the transmit segment requests 211 separately, but may receive them simultaneously. In the event of a contention situation, the receive segment identifier 301 and the receive segment event signal 203 are processed before the transmit segment request 211. The fetch block 300 accepts the receive or transmit segment identifiers 301, 305 and latches an appropriate one of the segment identifiers for further availability to the rest of the TCP circuitry.

The fetch block 300 addresses the external state memory 212 with state address 213 and presents or accepts the state data 214 for storage or retrieval. The state memory 212 is a dynamic memory, which is continually updated as testing proceeds. A portion of the state data 214 includes a group identifier 302. When the fetch block 300 accepts the state data 214, it isolates the group identifier 302 for presentation as an address into parameter memory 304. The parameter memory 304 contents are updated during a test configuration process prior to the testing process. Parameter memory 304 may also be updated during testing to modify behavior of a TCP connection. In response to presentation of the group identifier 302, the parameter memory 304 presents group parameters 306 to decode block 308 and presents group offset 310 to MAP 312 through parameter memory de-serializing and latching circuit 313. The MAP 312 sums the state address 213 with the group offset 310 to generate outgoing segment identifier 307.

The fetch block 300 outputs sequence step pointer 301, outgoing segment header fields 309, a current state 311, and current state data 319. The sequence step pointer 301 is found as a portion of the state data 214 and addresses a first word in sequence memory 303. Outputs from the sequence memory 303 through sequence memory de-serialize and latching circuit 316 are directed out of the TCP 202 as outgoing segment payload identifier 320. The sequence memory de-serialize and latching circuit 316 directs sequence decode data 322 to decode block 308 and sequence execute data 324 to execute block 318.

Receive segment functional block 314 accepts the receive segment header fields 201 without the receive segment identifier 301 and latches the receive segment header fields 201 for presentation to decode block 308. The receive segment block 314 is not altered from its previous state when a transmit segment event is processed by the fetch block 300.

A timer/counter block 326 accepts a clocking signal (not shown). In a specific embodiment, the clocking signal is based upon a 50 MHz system clock divided by 5. The timer/counter block 326 increments by 1 on a rising edge of the divided clocking signal and provides a reference timer 321 to the decode block 308. As one of ordinary skill in the art appreciates, system clocking and clocking speeds are a matter of design choice and are within the capabilities of one of ordinary skill in the art. Additionally, clocking technologies and clock speeds are scaleable as technology advances to higher and higher clock frequencies and use of various different materials to create the underlying circuitry.

The decode block 308 accepts the group parameters 306 from the parameter memory 304 through the parameter memory de-serialize and latching circuit 313, sequence decode data 322 from the sequence memory 303 through the sequence memory de-serialize and latching circuit 316, current state data 319 from the fetch block 300, the receive segment header fields 201 from the receive segment block 314, and next state data select 327 from the execute block 318. The decode block 308 accepts the current state data 319, the reference timer 321, and the receive segment header fields 201, and the sequence decode data 322 and calculates a plurality of possible next state data 323. The decode block 308 also processes the current state data 319, the reference timer 321 and the receive segment header fields 201 to reduce the information for presentation to the execute block 318 as 16 single bit state inputs 328.

The execute block 318 determines an actual next state 325 based upon the current state 311, the sequence execute data 324, and the state inputs 328. The execute block 318 presents the next state 325 to the fetch block 300 and the next state data select 327 to the decode block 308 indicating which of the calculated possible next state data should be presented as next state data 323 from the decode block 308 to the fetch block 300. The next state data select 327 is in a format of 16 single bit inputs from the execute block 318 to the decode block 308. Accordingly, the execute block 318 accepts and processes the state inputs 328 from the decode block 308 to determine the next state 325 and then presents to the decode block 308 the next state data select 327 as multiple single bits of data. The decode and execute blocks 308, 318 are described herein as separate functional entities. In a specific embodiment, circuitry for the decode block 308 is optimized for calculation and comparison operations, which tend to dominate the pre-processing function. Circuitry for the execute block 318 is optimized for decision execution. Because each block 308, 318 is optimized for the functions that predominate, the combination is optimized. As one of ordinary skill in the art appreciates, the distinction made between the decode and execute blocks 308, 318 is for the primary purpose of clarity of description. Specifically, the decode block 308 is circuitry that provides decoding for use by the circuitry that makes up the execute block. The execute block 318 is circuitry that makes the next state decision based upon the decoded data. There are many ways to implement the decode and execute blocks 308, 318 depending upon the design program, vendor and materials technology used. Implementation of the present teachings is within the capabilities of one of ordinary skill in the art of circuit design having benefit of the present teachings. Alternative embodiments may have the decode and execute circuitry implemented as a single functional entity or may break down the decode and execute functions into more than the two functions as described herein.

The sequence memory 303 defines a list of steps a connection exchange undergoes. Each sequence step defines the conditions that when met, result in advancing the connection to the next sequence step and the possible transmission of the segment specified by the step. The sequence memory 303 provides sequence decode data 322 to the decode block 308, the sequence execute data 324 to the execute block 318, and the outgoing segment payload identifier 320 to the segment generator 207. In a specific embodiment, the sequence memory is 32-bits wide and a single sequence memory record is stored in four (4) sequential memory address locations. The first two words in the sequence memory record are used for purposes of pre-execution sequencing functions, and the second two words are used for purposes of post-execution sequencing functions. The sequence step pointer 301 points to a first address location of the corresponding record in the sequence memory 303 and the sequence memory de-serialize and latching circuit 316 buffers and presents the parallel data to the rest of the TCP 202. In a specific embodiment, the first word of the sequence memory record contains a sequence command, an expected segment size, and a flag indicating an end of sequence. The sequence command is used by the execute block 318 to specify an operation. The sequence memory stores information used to indicate to the execute block a next step in a predefined sequence of operations and also directs how segments are to be transmitted. In a specific embodiment, the possible operations defined in the command field of the sequence memory are immediate send of a single segment, receive and send a single segment, receive and don't send a single segment, immediate send of a multiple segment transfer, receive and send a multiple segment transfer, and a receive and acknowledge a multiple segment transfer. The expected segment size is used by the decode block 308 to determine what condition must be set to send the segment or segments. The third word of the record is a segment size to send used by the decode block 308. The fourth word of the record in the sequence memory 303 is the outgoing segment payload identifier 320, which is sent to the segment generator 207 as part of the outgoing segment header information 209 and indicates to the segment generator 207 what type of payload is to be sent as part of the transmitted segment.

The parameter memory 304 permits definition of TCP properties for one or more flow groups. A flow group is a group of connections that exhibit similar properties. In a specific embodiment, the flow group concept is used to emulate TCP traffic coming from a particular operating system or application. The group identifier 302 from the state data 214 is used to address a first word in the flow group record stored in the parameter memory 304. The flow group record is seven (7) 32-bit words. The flow group record contains a sequence start pointer. The sequence start pointer flows through the decode block 308 and is used to update the state data 214 if the sequence start is reset. The sequence start pointer becomes the sequence memory pointer 301 stored in the state data 214 for the specific connection to be used the next time the connection is processed. The flow group record further includes a retry number, a connection close type, a connection open enable, and a connection close enable, all of which are used by the decode block 30 as defined in the TCP standard. The flow group record further includes congestion avoidance enable and a fast retransmit enable flags, which are used to turn the congestion avoidance and fast retransmit on or off for each defined flow group. The flow group record further includes a retransmission timeout value, maximum window size, initial window size, and maximum segment size, which are used by the decode block 308 as defined in the TCP standard. The flow group record also includes the group offset 310 for use with the MAP 312. The flow group record further includes transmit size. The transmit size indicates a total number of octets that are transferred for a multiple packet transmission as defined by the sequence command. The transmit size is used to emulate a file transfer network operation. The flow group record also includes a sequence wait time to indicate an amount of time that the connection remains open after the sequence steps are completed before closing the connection. Alternatively, the sequence wait time may indicate the amount of time for time wait sequence steps. Advantageously, all of the flow group parameters in the parameter memory 304 may be dynamically modified during a test. Accordingly, in a specific embodiment, all of the flow group parameters are initialized prior to test start. A total number of different flow groups that are supported depends upon the size of the parameter memory 304 and the width of the group identifier 302. As one of ordinary skill in the art appreciates, other parameters may be stored in the parameter memory 304 and used as part of the flow group, the parameters described being those used in a specific embodiment.

The execute block 318 presents the calculated next state 325 to the fetch block 300. In a specific embodiment, the next state 325 is represented as a 4-bit field defining the next state as one of the following states:
closed,
listen,
syn sent,
syn received,
fin wait 1,
fin wait 2,
close wait, closing,
last ack,
time wait, and
established.

The execute block 318 also presents outgoing segment transmit 315 and outgoing segment type 317 as portions of the outgoing segment header information 209. The decode block 308 provides the next state data 323 to the fetch block 300 for purposes of updating the state memory 212 with updated state data 214. Advantageously, the separation of functions between the decode block 308 and the execute block 318 in a specific embodiment according to the present teachings permits some amount of decode pre-processing for improved performance.

The decode block 308 passes decode measurement data 331 and the execute block 318 passes measurement execute signals 330 to measurement block 329.

Figure 4:
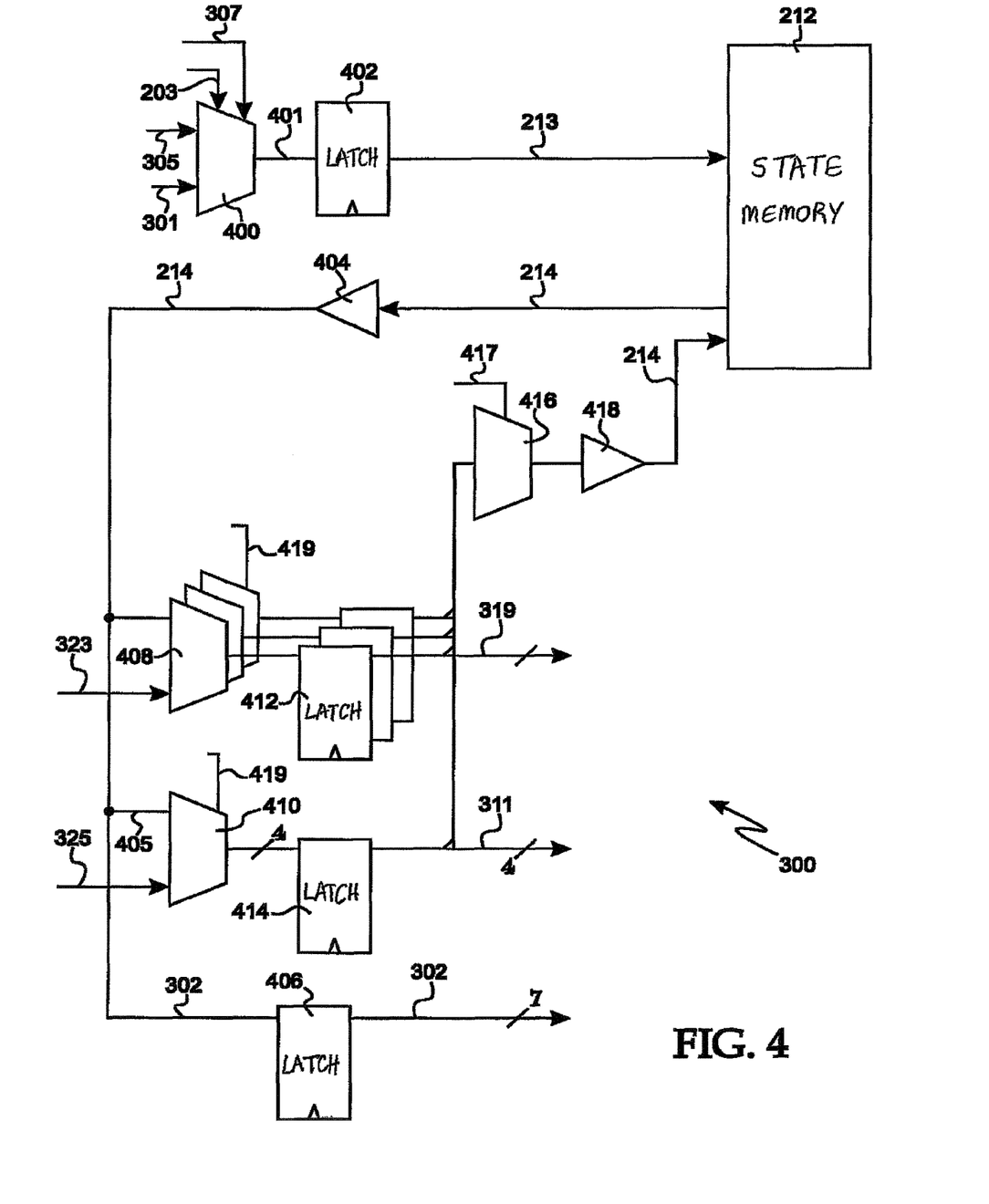
FIG. 4 illustrates a more detailed view of a specific embodiment of the fetch block logic that is consistent with the present teachings.

With specific reference to FIG. 4 of the drawings, there is shown a more detailed view of a specific embodiment of the fetch block 300 consistent with the present teachings in which the receive segment identifier 301 and the transmit segment identifier 305, both being 16 bits in width in the specific embodiment illustrated, are presented to an identifier selector 400. In the specific embodiment, the identifier selector 400 is a 2×1 16-bit multiplexer controlled by the receive segment event signal 203 and the transmit segment event signal 307 in combination with supporting logic. Both event signals 203, 307 are single bit signals and indicate to the fetch block 300 that the respective segment identifier 301, 305 has valid data. If the receive segment event 203 goes true, the identifier selector 400 places the receive segment identifier 301 at the identifier multiplexer output 401 where it can be latched into identifier latch 402. If the transmit segment event 307 goes true, the identifier selector 400 places the transmit segment identifier 305 at the identifier multiplexer output 401 where it can be latched into the identifier latch 402. As one of ordinary skill in the art appreciates, therefore, the transmit and receive segment identifiers 301, 305 are similarly processed. If the transmit segment event signal 307 goes true at the same time as the receive segment event signal 203, the identifier selector 400 has a hold-off function whereby the receive segment event signal 303 is processed first and then the transmit segment event signal 307 is processed when the receive segment event signal 203 processing is complete. Advantageously, all events are processed in the event of a contention situation and the receive segments are processed first because receive data segments are valid for a limited amount of time and must be given priority for processing to avoid data loss.

The output of the identifier latch 402 presents itself as state address 213 and addresses state memory 212. Data in the state memory 212 located beginning at the state address 213 is presented to the fetch block 300 as state data 214. The state data 214 is stored in the state memory 212 in multiple words of memory. The state address 213, therefore, addresses a first word in the section of state memory 212 that stores the corresponding state data 214. In a specific embodiment, the state memory 212 is 32 bits in width and the state data 214 is stored in eight (8) sequential locations of the state memory 212 for a total of 256 bits.

In a specific embodiment of a TCP implementation according to the present teachings, most of the state data 214 stored in the state memory 212 comprise parameters defined in the TCP standard including: connection state, duplicate ACK counter, count of the number of retry attempts, connection enable flag, timeout timer active flag, congestion control active flag, timeout value, unacknowledged sequence number, next sequence number, slow start threshold, send window size, and receive window size, next sequence number expected.

There are four parameters that are not defined in the TCP standard, but in the present teachings are stored as state data 214 including: a connection group identifier, sequence state, a current sequence step pointer and a sequence end pointer. The connection group identifier 302 defines a connection group to which the connection belongs and is used to index the parameter memory 304. The sequence state maintains a current status of each segment. The current sequence step pointer 301 points to a first word of a current sequence step record in sequence step memory 303. The sequence end pointer defines an ending sequence number for a multiple segment data transfer.

The state data 214 is buffered 404, de-serialized, latched and apportioned according to function. A group identifier 302 portion of the state data 214 is presented to group identifier latch 406 where the output addresses the parameter memory 304 for accessing data used elsewhere in the TCP 202. The current connection state 405 portion of the state data 214 is directed to state selector 410 and state latch 414. Each remaining state item defined as part of the state data 214 is associated with a respective one in a plurality of state data selectors 408 and a respective one in a plurality of corresponding state data latches 412. In the specific embodiment, there are a total of 16 separate state data selectors 408 and 16 respective state data latches 412. At the completion of a fetch block read cycle, the state data latches 412 are loaded with de-serialized state data 214 from the state memory 212. The state data latches 412 thereby present all of the current state data 319 to the decode block 308. The current state 311 is presented to the execute block 318 and the group identifier 302 is presented to the parameter memory 304.

In a specific embodiment, a read cycle in the fetch block 300 reads from the state memory 212 and comprises a series of eight (8) reads to access and latch the state data 214 into the respective state data latches 412, the group identifier latch 406, and the state latch 414. A read/write select 419 indicates the desired source of the data. In a read cycle, the source of the data is from the state memory 212. In a write cycle, the source of the data that is to be updated in the state memory 212 is the next state 325 from the execute block 318 and the next state data 323 from the decode block 308.

After the TCP 202 processes the receive or transmit segment identifier 301, 305, the fetch block 300 updates the state data 214 and stores it back into the state memory 212. Serializing selector 416 segments the state data 214 into the multiple words appropriate for storage through buffer 418 into the state memory 212. Serializing selector write select 417 selects which inputs of the serializing selector 416 are stored to the state memory 212 during a write cycle of the fetch block 300.

The fetch block is adapted to inhibit access to the state memory if a previously processed transmit or receive segment identifier matches a current receive or transmit segment identifier. Specifically, the supporting logic that is part of the identifier selector 400 compares the transmit segment identifier 305 and the receive segment identifier 301. If the two identifiers 301, 305 are the same, it is known that the current state 311 and the current state data 319 are already latched into the fetch block latches 412 and 414. Therefore, a signal is sent to the remaining fetch block logic that inhibits a next read cycle from the state memory 212. Advantageously, this permits more efficient processing by skipping unnecessary read cycles when the segment identifiers 301, 305 match. If the segment identifiers 301, 305 do not match, the read cycle proceeds.

The connection group identifier portion of the state data 214 is latched in the fetch block 300 and is presented to the parameter memory 304 as the group identifier 302. The parameter memory 304 contains parameters common to a group of connections. In a specific embodiment, 128 connection groups are possible.

The DoD Standard Transmission Control Protocol (TCP) standard (herein "the TCP standard") is defined in RFC 793 published September 1981, and the TCP congestion control standard (herein "the Congestion Control standard") is defined in RFC 2581 published April 1999, the contents of both referenced documents are hereby incorporated by reference. The decode and execute functional blocks 308, 318 implement a large portion of the TCP and Congestion Control standards. Those portions not implemented are either implemented in another part of the tester 100 or are not considered crucial to the realistic simulation and test of network traffic. Those portions of the TCP and Congestion Control standards not implemented in the decode and execute blocks 308, 318 of the specific embodiment may, however, be implemented in other embodiments according to the present teachings. The subset of the standard chosen for implementation in a specific embodiment maximizes the ability to generate a realistic stream of data and properly respond to the generated data stream to maintain the validity of resulting measurements as they relate to test of the device.

The TCP and Congestion Control standards are implemented in a combination of the decode and execute blocks 308, 318. Specifically, the decode block 308 performs computations according to the TCP and Congestion Control standards and determines if and when a new segment is to be transmitted. The decode block 308 sends results of the computations to the execute block 318 as the state inputs 328. The execute block 318 makes a determination based upon the state inputs 328 regarding the appropriate next state 325 and what is to be a next segment transmitted 209.

The decode block 308 computes the variable data upon which a TCP transmission is based and sends binary flags in the form of the state inputs 328 to the execute block 318. The execute block 318 uses the state inputs 328, the sequence execute data 324 and the current state 311 to make a final determination of the nest state 325 and what segment to transmit 209. The decode block 308 is optimized for computational efficiency to perform computation and compare functions in parallel and prepares results of the computation and compare functions for presentation to the execute block 318. The execute block 318 may, therefore, make an efficient final determination based upon the current state 311, the sequence execute data 324, and the state inputs 328. The execute block 318 then disseminates the final determination in the form of the next state 325 and next state data select 327 for update in the state memory 212. In addition, the execute block 318 directs next segment transmission using the output segment transmit 315 and outgoing segment type 317.

The state inputs 328 comprise single bit signals from the decode block 308 to the execute block 318 where a logic "1" indicates that the condition is true. Many of the sequence number comparisons are defined in Section 3.3 of the TCP standard and a remainder of the state inputs 328 are defined elsewhere in the standard or are implementation dependent. The state inputs 328 include:

1. Timeout: a true means that the timer 326 is greater than a timeout value stored for an individual connection in the state data 214 i.e. the timer is expired.
2. Enable: turns an individual flow on (true)/off (false) dynamically.
3. Timer active: a true enables the relevance of a timeout condition and the timeout signal.
4. Receive window is less than receive window maximum: true means that a number of segments received in a current window is less than the maximum number of segments are may be received in a single widow.
5. The received acknowledged segment number is equal to a next segment number to be sent: true indicates that the next segment number is the segment number that is expected (server side).
6. The received acknowledge segment number is less than or equal to a next segment number to be sent: true means that the current segment is valid (server side).
7. The segment sequence number is equal to the next segment number expected to be received next: true means that the current segment sequence number is valid (client side).
8. The sequence end field in the state data is equal to the receive next field in the state data: true means that the client has finished receiving all expected segments (client side).
9. The sequence end field in the state data is equal to the segment number last acknowledged sequence: true indicates that all segments sent by server is successfully received and connection may be closed (server side).
10. The sequence end field in the state data is equal to the last received segment sequence number: true indicates that all segments received by client is successfully received and connection may be closed (client side).
11. The sequence number to be sent next equal to send oldest unacknowledged sequence number: true indicates that all segments sent have been acknowledged (server side).
12. The next sequence number to be sent is within the current send window: true means that a next segment may be sent.
13. Segments sent, but not yet unacknowledged is less than the segment to be acknowledged: true indicates that the segment to be acknowledged is within the valid range.
14. Fast retransmit: true indicates client is missing segments.
15. Round trip time: true indicates that the round trip time is valid. This is collected as a statistic.
16. Retry max: true indicates that a maximum number of retries to send a segment is exceeded and connection may be aborted.

With specific reference to section 3.2 "Terminology" of the RFC 793, a specific implementation according to the present teachings maintains all of the send sequence and receive sequence variables as part of the state data 214 except for the send urgent pointer and receive urgent pointer. In the present implementation, the send and receive urgent pointers are useful for a specific type of network session that does not place a stress on a performance of the standards. Accordingly, in the interest of simplification, the urgent pointer function is not implemented in a specific embodiment according to the present teachings. The present teachings, however, do not preclude its implementation.

The receive segment header fields 201 according to the present teachings maintain all of the current segment variables except the segment urgent pointer and the segment precedence value. The segment urgent pointer is not implemented for the same reason articulated with respect to the send and receive sequence variables. The segment precedence value is not implemented in the decode and execute blocks 308, 318, but is implemented within the segment generator 207 portion of the tester 100.

The execute block 318 implements all states and transitions as shown in FIG. 6 of the TCP standard. Specifically, the execute block 318 accepts the current state 311 and sequence execute data 324. Based upon the calculated state inputs 328 from the decode block 308, the execute block determines the next state 325.

The decode and execute blocks 308, 318 implement the functions defined in sections 3.3 through 3.5. The execute block 318 according to the present teachings does not implement Precedence and Security section 3.6 of the RFC 793, but the present teachings do not preclude its implementation.

The present teachings implement Retransmission Timeout section 3.7, but implement a fixed retransmission timeout instead of the dynamic algorithm as defined in the standard and do not implement the communication of urgent information. The present teachings, however, do not preclude its implementation. The window management function as defined in this section is performed primarily by the decode block 308. Specifically, the receive segment header fields 201 provide acknowledgement of sent segments. The decode block 308 processes the acknowledged segments before determining if and when a next segment may be transmitted. Section 3.8 of the TCP standard is not implemented in a tester according to the present teachings because it applies primarily to software interfaces between an application and the TCP layer.

Section 3.9 of the RFC 793 defines event processing. Events implemented in a specific embodiment according to the present teachings include "segment arrives" and "retransmission timeout" as defined in the section of the TCP standard. Events between the TCP layer and the application layer are not precluded, but are not implemented in a specific embodiment according to the present teachings.

When the execute block 318 determines the next state 325 of the current connection and transmits the next segment 209, the execute block 318 disseminates its decision to the fetch block 300 in the form of the next state 325 and to the decode block 308 in the form of the next state data select 327. The decode block 308 accepts the next state data select 327 and returns the next state data 323 to the fetch block 300 for update of the state data 214 in the state memory 212. The next state data select 327 is in the form of twenty-one (21) single bit signals indicating conditions of the next state 325 including:

1. Set fast retransmit: true is an acknowledgement that a fast retransmit has been processed.
2. Set slow start and congestion avoidance: true is an acknowledgement that a timeout has occurred.
3. Timeout set active: true initiates reset of the timer for the last transmitted segment.
4. Timeout set to retransmission timeout value: true initiates setting the timeout value to the timeout value in the parameter for the defined connection group.
5. Timeout set to time: true sets the timer to the wait time in the parameter memory for the current connection group.
6. Retry reset: true indicates that the most recent retry for the connection was successful and that the retry counter may be reset.
7. Retry increment: true indicates that another retry was attempted and causes the decode block 308 to increment a retry counter by one.
8. Last unacknowledged segment number sent is set equal to the segment number of the last segment received: true indicates that the last unacknowledged segment number should be updated.
9. Send next increment: true increments the send next field in the state data 214 by integer value of one. The signal is used specifically when opening and closing a TCP connection.
10. Send next increment by send length: true indicates the send next field in the state data 214 is incremented by the number of octets sent per segment as stored in the sequence memory (server side).
11. Send next set to send unacknowledged: true initiates a resetting of the send next point to the last unacknowledged segment sent.
12. Send next set to timer: true indicates that the timer is to be used to initialize the first sequence number.
13. Sequence pointer reset: true indicates that the sequence pointer should be reset to the first sequence step stored in the sequence memory.
14. Sequence pointer increment: true indicates that the sequence pointer should be incremented to the next sequence step.
15. Receive window decrement by segment length: true indicates that the receive window size is to be reduced in length by the segment length already received (client side).
16. Receive window incremented by receive length: true indicates that the receive window is opened with a predefined size as defined in the current connection group.
17. Receive next reset: true indicates a new connection and the receive next field in the state data 214 is reset to zero.
18. Receive next increment by segment length: true increments the receive next field in the state data 214 by the segment length of the last segment received (client side).
19. Receive next set to segment sequence increment: true indicates that during a new connection, the receive next field in the state data 214 is set to the sequence number of the segment just received.
20. Sequence end load into send next: true when connection is opened and initiates setting sequence end field in the state data 214 to the sequence number that closes the current connection (server side).
21. Sequence end load receive next: true sets sequence end field in the state data 214 to the sequence number that closes the current connection (client side).

The decode and execute blocks 308, 318 communicate results of each segment processing to the measurement block 329 with the execute measurement signals 330, the current segment size 331 (expressed in units of octets), and the round trip time 332. For purposes of the statistics, a "connection" is defined as a bi-directional TCP data stream or "flow". Each connection may be characterized as being in one of four possible states: "opening", "opened", "closing", and "closed". An "active connection" is in the "opening", "opened", or "closing" states. If a connection fails, it may be characterized as either "failed to open", which is a connection that failed during an opening state, or "failed after open", which is a connection that failed sometime after reaching the "opened" state. Based upon these definitions, the measurement block 329 uses the execute measurement signals 330 and the segment size 331 and the round trip time 332 to collect the following statistics:

1. TCP active connections: counts connections that are in the "opening", "opened" or "closing" states.
2. TCP connections established: counts connections in the "opened" state.
3. TCP connections attempted: counts connections entering the "opening" state.
4. TCP connections that Failed to Open: counts a connection that entered the "opening" state, but did not reach the "opened" state.
5. TCP connections that Failed after Open: counts connections that failed after reaching the "opened" state.
6. TCP timeouts: counts the timeouts reached.

7. TCP fast retransmit conditions: counts fast retransmits initiated.
8. TCP retransmitted layer-4 payload octets: counts octets in the payload that were retransmitted.
9. TCP segments transmitted: counts segments transmitted from the TCP 202.
10. TCP segments received: counts valid segments received by the TCP 202.
11. TCP layer-2 octets transmitted: counts layer 2 octets transmitted by the TCP 202.
12. TCP layer-2 octets received: counts layer 2 octets received by the TCP 202.
13. TCP good layer-4 octets received ("goodput octets"): counts layer 4 octets received by the SPC 200.
14. TCP good layer-4 segments received ("goodput segments"): counts valid layer 4 segments received by the TCP 202.
15. TCP round trips: counts round trip.

The SPC 200 collects the following statistics on a per port basis only:
16. TCP misdirected segments statistic: number of valid TCP segments received by the TCP 202, and
17. TCP checksum errors received: number of valid TCP segments received that contain a TCP checksum error.

The CPU 204 accesses the measurement block 329 and the SPC 200 at regular sampling intervals to gather and display the statistics collected. In a specific embodiment, the sampling interval is 1 second, but other intervals are also possible. In addition, software in the CPU 204 derives the following statistics:
18. TCP segments not received: the client side is calculated by subtracting the client group received segments from the server group transmitted segments. The server side is calculated by subtracting the server group received segments from the client group transmitted segments,
19. TCP layer-2 throughput transmitted: calculated by presenting the number of octets transmitted during the sampling interval, and a
20. TCP layer-2 throughput received: calculated by presenting the number of octets received during the sampling interval.

The execute measurement signals 330 comprise single bit signals set by the execute block 318 when one or more of the measured conditions occurs. Each single bit signal of the measurement execute signals 330 connects to a respective counter in the measurement block 329. Each counter in the measurement block 329 increments upon receipt of a logic true. The CPU accesses the measurement block 329 at regular intervals, the sampling interval. The counters respond to the execute measurement signals 330 by accumulating counts over each sampling interval. After the CPU reads each counter, the counter is reset and begins accumulating over the new sampling interval. The CPU updates and presents the instantaneous values at each sampling interval on a display. The CPU also calculates and maintains cumulative values of the same statistical measurements and displays the cumulative values as well.

The segment size 331 and round trip time 332 is transmitted to the measurement block 329 at the same time as the measurement execute data 330. In a specific embodiment, the segment size is a 16-bit word containing a number of the octets received or transmitted in the current segment. The round trip time 332 is a 32-bit word representing round trip time for the current segment. In the specific example of the TCP round trip statistic, the counter in the measurement block 329 counts the number of round trips made during the sampling interval. The measurement block 329 also accumulates the round trip time 332 when it receives the round trip signal in the measurement execute signals 330. The CPU 204 calculates and presents an average round trip time by dividing the accumulated total of round trip time by the total number of round trips within the sampling interval.

As one of ordinary skill in the art appreciates, the measurement block 329 is able to count or calculate the statistics either based upon a straight reading from the incrementing counter or a calculation of the incrementing counter and the transmitted or received octet size or the round trip time. In many cases, two values are collected for each measurement. One is an instantaneous measurement, which is collected during a single predefined sampling interval. The other is a cumulative measurement, which is a running accumulation of the events over the entire test.

Embodiments of the teachings are described herein by way of example with reference to the accompanying drawings describing a method and apparatus for generating realistic network traffic and measuring a devices response to the generated traffic. Other variations, adaptations, and embodiments of the present teachings will occur to those of ordinary skill in the art given benefit of the present teachings.

The invention claimed is:

1. An apparatus comprising:
a stream processor controller accepting a received data stream comprising a plurality of segments in a series, the stream processor controller filtering received segments from the received data stream,
a segment processor having processing logic implemented in hardware accepting and processing header fields of the received segments,
a rate generator sending requests to transmit segments to the segment processor,
the segment processor accepting and responding to the requests by generating outgoing segment header fields, the segment processor maintaining a state of each received and outgoing segment in a state memory,
a template memory storing therein templates for a transmit segment, and
a segment generator responding to the outgoing header fields to access a template stored in the template memory and to use the outgoing header field and the template to generate a transmitted data stream.

2. An apparatus as recited in claim 1 wherein the segment generator prepares and launches a plurality of transmitted segments to form the transmitted data stream, each transmitted segment based upon the outgoing header fields.

3. An apparatus as recited in claim 1 wherein the segment processor collects statistics based upon information contained in the received and transmitted header fields.

4. An apparatus as recited in claim 1 wherein the segment processor is a field programmable gate array.

5. An apparatus as recited in claim 1 wherein the stream processor controller filters received segments identified as TCP segments for acceptance by the segment processor.

6. An apparatus as recited in claim 1 wherein the segment generator generates and launches TCP segments based upon the outgoing header fields.

7. An apparatus comprising:
a fetch block adapted to receive a receive segment identifier corresponding to a current one in a plurality of TCP connections,
a state memory adapted to maintain state data corresponding to a current state of each of the plurality of the connections, the fetch block adapted to access state data of a current connection based upon the receive segment identifier, the fetch block adapted to receive a transmit segment identifier and access the state data of the current connection based upon the transmit segment identifier, an execute block adapted to determine a next state of the current connection based upon the current state of the current connection and a receive segment header field, the execute block adapted to signal events related to the next state of the current connection, a measurement block adapted to accumulate the events and maintain statistics relating to network traffic, and the fetch block adapted to update the state memory with the next state of the current connection.

8. An apparatus as recited in claim 7 wherein the execute block signals the events with a plurality of single bit indications and the measurement block further comprises a respective plurality of counters that accumulate each single bit event indication.

9. An apparatus comprising:

a fetch block adapted to receive a receive segment identifier corresponding to a current one in a plurality of TCP connections, a state memory adapted to maintain state data corresponding to a current state of each of the plurality of the connections, the fetch block adapted to access state data of a current connection based upon the receive segment identifier, an execute block adapted to determine a next state of the current connection based upon the current state of the current connection and a receive segment header field, the execute block adapted to signal events related to the next state of the current connection, a measurement block adapted to accumulate the events and maintain statistics relating to network traffic, the fetch block adapted to update the state memory with the next state of the current connection, and a decode block calculating a plurality of possible next state data according to a TCP standard and sends an indication to the execute block if and when a new segment is to be transmitted.

10. An apparatus as recited in claim 9 wherein the execute block accepts the indication, determines a next segment to be transmitted, and generates outgoing segment information.

11. An apparatus comprising:

a fetch block adapted to receive a receive segment identifier corresponding to a current one in a plurality of TCP connections, a state memory adapted to maintain state data corresponding to a current state of each of the plurality of the connections, the fetch block adapted to access state data of a current connection based upon the receive segment identifier, an execute block adapted to determine a next state of the current connection based upon the current state of the current connection and a receive segment header field, the execute block adapted to signal events related to the next state of the current connection, a measurement block adapted to accumulate the events and maintain statistics relating to network traffic, the fetch block adapted to update the state memory with the next state of the current connection, and a sequence memory wherein the fetch block accesses the sequence memory for presentation of a sequence command to the execute block.

12. An apparatus as recited in claim 11 wherein the execute block responds to the sequence command to determine the next state of the current connection.

13. An apparatus as recited in claim 7, the fetch block further adapted to hold off processing of the transmit segment identifier if the receive segment identifier and transmit segment identifier arrive simultaneously.

14. An apparatus comprising:

a fetch block adapted to receive a receive segment identifier corresponding to a current one in a plurality of TCP connections, a state memory adapted to maintain state data corresponding to a current state of each of the plurality of the connections, the fetch block adapted to access state data of a current connection based upon the receive segment identifier, an execute block adapted to determine a next state of the current connection based upon the current state of the current connection and a receive segment header field, the execute block adapted to signal events related to the next state of the current connection, a measurement block adapted to accumulate the events and maintain statistics relating to network traffic, and the fetch block adapted to update the state memory with the next state of the current connection, wherein the fetch block is adapted to inhibit access to the state memory if a previously processed segment identifier matches a current segment identifier.

15. An apparatus comprising:

a fetch block adapted to receive a receive segment identifier corresponding to a current one in a plurality of TCP connections, a state memory adapted to maintain state data corresponding to a current state of each of the plurality of the connections, the fetch block adapted to access state data of a current connection based upon the receive segment identifier, an execute block adapted to determine a next state of the current connection based upon the current state of the current connection and a receive segment header field, the execute block adapted to signal events related to the next state of the current connection, a sequence memory adapted to indicate to the execute block a next step in a predefined sequence of operations, and a measurement block adapted to accumulate the events and maintain statistics relating to network traffic, the fetch block adapted to update the state memory with the next state of the current connection.

16. An apparatus comprising:

a fetch block adapted to receive a receive segment identifier corresponding to a current one in a plurality of TCP connections, a state memory adapted to maintain state data corresponding to a current state of each of the plurality of the connections, the fetch block adapted to access state data of a current connection based upon the receive segment identifier, an execute block adapted to determine a next state of the current connection based upon the current state of the current connection and a receive segment header field, the execute block adapted to signal events related to the next state of the current connection, a sequence memory adapted to indicate an outgoing segment payload identifier to a segment generator, and a measurement block adapted to accumulate the events and maintain statistics relating to network traffic, the fetch block adapted to update the state memory with the next state of the current connection.

17. An apparatus as recited in claim 9 and further comprising a parameter memory adapted to maintain TCP parameters that are common to at least one flow group, the parameter memory addressable by a group identifier from the state data, wherein the TCP parameters inform the decode block.

18. A method comprising:

accepting a transmit or receive segment header field including a segment identifier related to one in a plurality of connections, maintaining state data corresponding to a current state of each of the plurality of connections, accessing state data in a memory corresponding to a current status of the identified connection based on the segment identifier, processing the segment header field according to a TCP standard, determining a next state of the current connection based upon the current state of the current connection and the transmit or receive segment header field and advancing the connection related to the receive segment header field to the next state, signaling events related to the next state of the current connection, accumulating the events and maintaining a plurality of statistics for the plurality of connections, at least one statistic indicating connection failures, and updating the memory with state data corresponding to the next state of the connection.

19. A method as recited in claim 18 and repeating the steps of accepting, accessing, processing, advancing, accumulating, and updating for each one in a plurality of segment headers.

20. The apparatus of claim 7 wherein the statistics relating to network traffic comprise at least one of:

a count of active connections;
a count of established connections;
a count of attempted connections;
a count of connections that failed to open;
a count of connections that failed after open;
a count of timeouts detected;
a count of fast retransmits initiated;
a count of retransmitted layer-4 payload octets;
a count of segments transmitted;
a count of segments received;
a count of layer-2 octets transmitted;
a count of layer-2 octets received;
a count of layer-4 octets transmitted;
a count of layer-4 octets received; and
a count of round trips.

21. The method of claim 18 wherein accumulating a plurality of statistics for the plurality of connections comprises accumulating at least one of:

a count of active connections;
a count of established connections;
a count of attempted connections;
a count of connections that failed to open;
a count of connections that failed after open;
a count of timeouts detected;
a count of fast retransmits initiated;
a count of retransmitted layer-4 payload octets;
a count of segments transmitted;
a count of segments received;
a count of layer-2 octets transmitted;
a count of layer-2 octets received;
a count of layer-4 octets transmitted;
a count of layer-4 octets received; and
a count of round trips.

* * * * *